US 6,698,809 B2

(12) United States Patent
Stol et al.

(10) Patent No.: US 6,698,809 B2
(45) Date of Patent: Mar. 2, 2004

(54) JOINT STRUCTURE AND METHOD FOR MAKING A JOINT STRUCTURE

(75) Inventors: Israel Stol, Pittsburgh, PA (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/108,040

(22) Filed: Mar. 27, 2002

(65) Prior Publication Data

US 2002/0158476 A1 Oct. 31, 2002

Related U.S. Application Data

(63) Continuation-in-part of application No. 09/990,807, filed on Nov. 20, 2001.
(60) Provisional application No. 60/252,712, filed on Nov. 22, 2000.

(51) Int. Cl.⁷ .............................................. B60R 19/24
(52) U.S. Cl. ...................................... 293/133; 293/155
(58) Field of Search ................................. 293/155, 133; 29/890.043; 228/114.5; 403/265, 266, 268, 270, 271; 296/29, 205

(56) References Cited

U.S. PATENT DOCUMENTS

| | | | | |
|---|---|---|---|---|
| 3,307,868 A | * | 3/1967 | Blank ........................ 293/133 |
| 3,693,238 A | | 9/1972 | Hoch et al. ................ 29/470.3 |
| 3,699,639 A | | 10/1972 | Ditto et al. ................ 29/470.3 |
| 3,797,873 A | * | 3/1974 | Cook ........................ 293/133 |
| 4,331,280 A | | 5/1982 | Terabayashi et al. ........ 228/112 |
| 4,542,846 A | * | 9/1985 | Matsui et al. ................ 228/112 |
| 4,618,163 A | | 10/1986 | Hasler et al. ................ 280/785 |
| 4,733,814 A | | 3/1988 | Penman ......................... 228/2 |
| 4,756,465 A | | 7/1988 | Pranch et al. ................ 228/115 |
| 4,829,979 A | * | 5/1989 | Moir ...................... 293/155 X |
| 4,850,802 A | | 7/1989 | Pankratz et al. .......... 416/213 R |
| 5,154,340 A | | 10/1992 | Peacock ..................... 228/112 |
| 5,188,278 A | | 2/1993 | Amao ........................ 228/112 |
| 5,314,106 A | | 5/1994 | Ambroziak et al. ....... 228/114.5 |
| 5,314,229 A | * | 5/1994 | Matuzawa et al. ....... 293/133 X |
| 5,381,849 A | | 1/1995 | Fussnegger et al. ......... 164/102 |
| 5,397,115 A | | 3/1995 | Vlahovic ..................... 296/29 |
| 5,403,049 A | | 4/1995 | Ebbinghaus ................ 293/133 |
| 5,469,617 A | | 11/1995 | Thomas et al. ........... 29/889.21 |
| 5,865,362 A | * | 2/1999 | Behrmann et al. ........ 228/114.5 |
| 6,139,094 A | | 10/2000 | Teply et al. .............. 596/203.3 |
| 6,299,226 B1 | * | 10/2001 | Kroning et al. ......... 293/133 X |
| 6,354,482 B1 | * | 3/2002 | Diebold et al. ........... 228/112.1 |

FOREIGN PATENT DOCUMENTS

| | | |
|---|---|---|
| DE | 196 00 933 A1 | 7/1997 |
| EP | 1 055 478 A1 | 11/2000 |

\* cited by examiner

*Primary Examiner*—Dennis H. Pedder
(74) *Attorney, Agent, or Firm*—Julie W. Meder; Gary P. Topolosky

(57) ABSTRACT

An energy absorbing assembly for a vehicle including an elongated crash box having ends with circular cross-sections. One end of the crash box is received in a bumper beam and is friction welded to an inside surface of the beam. The other end of the crash box is friction welded to a bracket assembly.

9 Claims, 18 Drawing Sheets

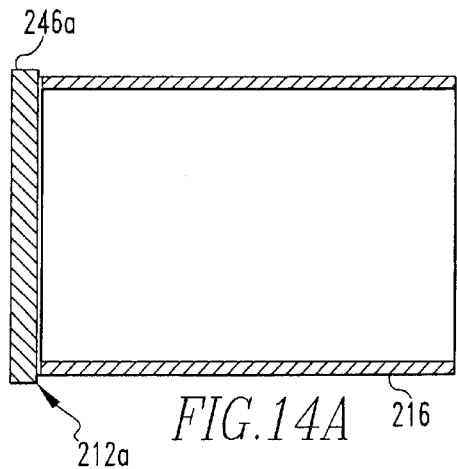
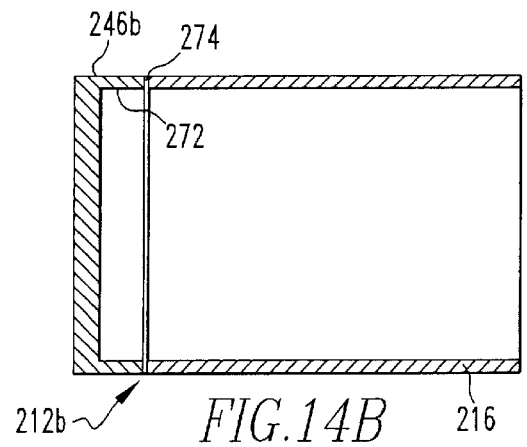
FIG.14A
FIG.14B
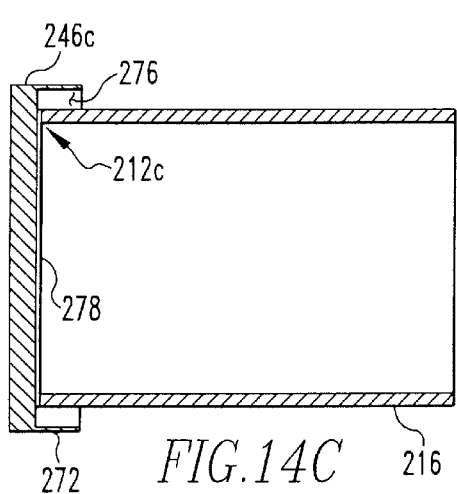
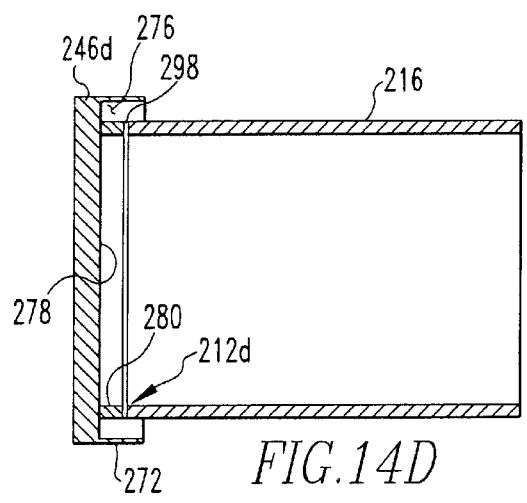
FIG.14C
FIG.14D

JOINT STRUCTURE AND METHOD FOR MAKING A JOINT STRUCTURE

RELATED APPLICATIONS

This application is a continuation-in-part of U.S. patent application Ser. No. 09/990,807 filed Nov. 20, 2001, which claims the benefit of U.S. Provisional Patent Application Ser. No. 60/252,712 filed Nov. 22, 2000, entitled "A Joint Structure and Method for Making a Joint Structure".

BACKGROUND OF THE INVENTION

1. Field of the Invention

The invention generally relates to joint structures and methods for forming joint structures that are ideally suited for use in a vehicle body-in-white. More specifically, the invention provides both a friction welded joint assembly in which lineals and sheet, cast or extruded components are joined together and a structure and method for improving the stability of the joint structure.

2. Description of the Prior Art

It is known that various structural components for automobiles and other vehicles can be made from aluminum and other light metal alloys. Considerable development work is now underway with an objective of utilizing aluminum and other light metal alloys in the primary body structure of a vehicle or, as it is often called, the "body-in-white." An automobile chassis or body-in-white comprised of light metal alloys weighs considerably less than a steel frame that has been designed to satisfy the same requirements of safety and durability. A vehicle utilizing such a body-in-white produced from light metal alloys has improved fuel efficiency without sacrificing performance. Moreover, if the alloys utilized is an aluminum alloy, it is more easily recycled than a steel frame vehicle, and it offers improved corrosion resistance. In addition, it is known that a body-in-white utilizing space frame technology will distribute and absorb the forces encountered in the normal operation of an automobile as well as absorb and dissipate the energy of a crash or rollover.

By way of brief explanation, the space frame is a latticed framework of structural beams and columns that are joined together at their ends. These structural components of the space frame, which are sometimes referred to as lineals, are connected together by mechanical means such as bolts, rivets and clinches, by welding and adhesive bonding, and by a combination of the aforedescribed methods. Another method for connecting the lineals of a space frame is by the use of separate joining components or connecting members which are often referred to as "nodes" into which the lineals are designed to fit. The lineals are then securely attached to the nodes by any of the known connecting methods referred to above. An example of this technology is found in U.S. Pat. No. 4,618,163 which pertains to an automobile chassis that includes lineals and nodes. This patent is incorporated herein by reference as if fully set forth herein. If the lineals are to be joined by means of connecting members or nodes, the nodes are typically cast or otherwise formed in a separate manufacturing operation. If the lineals are to be mechanically attached to each other or to nodes by means of bolts or other fasteners appropriate holes must be provided in the several components. In the alternative, or in addition, welding, soldering, or adhesive bonding equipment and materials may be required to effect the joining of the components. Furthermore, the tolerances of the various components that are to be assembled together must be exact, in order for holes to align with other holes, or with protrusions or in order for the surfaces to fit together for welding, soldering or adhesive bonding. Finally, the complete frame is assembled in a series of discreet steps involving the joining of individual lineals to nodes or to other lineals or components in order to form subassemblies and then the subsequent joining of the various subassemblies to form the entire body-in-white space frame. As noted above, U.S. Pat. No. 4,618,163 to Hasler et al., describes an automobile space frame chassis that is made from a plurality of tubular light metal lineals that are held together by connecting members also made from light metal. Hasler et al. discloses the use of tubular members assembled by inserting their end sections into recesses in the connecting or receiving members. However, this technique has the disadvantage that the last member to be mounted in an assembly or subassembly could only be mounted by flexing or bending the structure. The elongated frame members of Hasler et al. are secured to the connecting members by welding, soldering or cementing or by the use of mechanical fasteners such as bolts, screws, and rivets.

U.S. Pat. No. 5,381,849 to Fussnegger et al. discloses a method for casting a connecting member onto the end of a hollow section such as an extruded aluminum frame member. According to this method, an end of the hollow section is placed in a mold with the end of the hollow section closed with a plug to prevent penetration of cast material therein. This method is not used to join extruded frame parts to each other but rather to join them to a cast frame member. These cast frame members are complicated solid structures that are formed in complicated molds. In addition, because the Fussnegger et al. castings may be of considerable size, they may add considerable weight to the frame structure formed by this method. It clearly is desirable to join together the components of a space frame by a simple process that minimizes manufacturing steps, compensates for tolerances at the joints and is economical to implement.

SUMMARY OF THE INVENTION

The invention provides a joint structure ideally suited for use in the manufacture of assemblies and subassemblies in aluminum structures. More particularly, the alternative joint structures and methods of forming joint structures facilitate the assembly of a vehicle body-in-white. The friction welded joints of this invention provide assemblies in which lineals and sheet, cast, or extruded components are joined together.

The invention includes a joint structure having a first component with a lineal member having a pair of ends, at least one second component having a surface and a boss extending from the surface and terminating in a boss face, the second component defining an opening extending through the boss, wherein the opening receives one end of the lineal member such that the boss face and the end of the lineal member are coterminous, and a cap member adapted to be mounted onto the coterminous ends of the lineal member and boss face. Preferably, the cap member is friction welded to the end of the first component and the boss face. The boss has an inside diameter which tapers from a first diameter proximate said boss face, to a second diameter distal therefrom and a gap is defined in the opening between the boss and the lineal member.

A sleeve may be received in the gap and has a first face and a second face such that when positioned in the gap, the sleeve second face is proximate the cap member. The sleeve preferably is discontinuous such that a diameter of the sleeve is variable and the second face may include means for removably engaging the sleeve with said cap member inner face such as a plurality of teeth adapted to contact the cap member. Suitable materials for the sleeve include aluminum, steel, and plastic. When the sleeve first diameter is smaller than the sleeve second diameter, the sleeve outside surface tapers in a direction opposite from the direction of taper of the boss inside diameter and includes a plurality of raised members adapted to engage the boss.

The joint structure may include another second component adapted to receive the other end of the lineal member, wherein the first component and the two second components constitute a vehicle subassembly. The first component may be an aluminum product form such as a sheet product, an extruded product, and a cast product. The second component may be an aluminum product such as a sheet product, an extruded product, and a cast product. While at least one end of the lineal member has a circular cross-section, a mid-portion between the ends may have a different cross-sectional configuration than the end having a circular cross-section. Lineal members having non-circular cross-sectional configurations in their mid-portion may be sheet products, extrusions or castings suitable as components in a vehicle body-in-white subassembly. For sheet product formed into a lineal member, a reinforcing means such as a bead may be included proximate at least one end thereof.

The present invention also includes a method of forming a joint for a vehicle body-in-white comprising the steps of (1) inserting a first component having a lineal member with a pair of ends into an opening in a second component having a surface and boss extending from the surface, the opening extending through the boss, such that an end of the boss and the one end of the lineal member are coterminous; and (2) attaching a cap member onto the coterminous one end of the lineal member and the boss end. The attaching step preferably is accomplished by friction welding. A gap may be defined between the second component boss and the lineal member, and the method may further include a step of inserting a sleeve into the gap. The sleeve may include a discontinuous ring such that a diameter of the sleeve is variable between a maximum and minimum limit. The sleeve has a first face and a second face such that when positioned between the second component boss and the first component lineal member, the second face is proximate the cap member. The sleeve discontinuous second face facilitates a break in the continuity of an interface between the sleeve second face and the cap member during the step of friction welding the joint.

Also included in the present invention is an assembly of a first component including a lineal member having a pair of ends, at least one of the ends having a circular cross-sectional configuration; a cap member having a body portion, a first face, and a second face, the cap member being attached to the circular cross-section end of the lineal member, preferably via friction welding; a structural member having a body portion defining an opening wherein the first component is received in the opening such that the cap member is fixed to an inner surface of the structural member body portion; and means for retaining the circular cross-section end of the lineal member within the second component. In one embodiment of the retaining means, a bore is defined in each of the cap member body portion and the structural member body portion and a bolt extends through the bores in the cap member and the structural member to retain the circular cross-section end of the lineal member within the structural member. Preferably, a nut is threaded onto the bolt against an outer surface of the structural member body portion. Alternatively, a stud extends from the cap member and through a bore in the structural member body portion and a nut threads onto the stud against an outer surface of the structural member body portion. In another embodiment of the retaining means, the circular cross-section end of the lineal member is retained within the structural component via a joint: such as a friction stir weld, a laser weld, and a mechanical fastener between the cap member and the structural component body portion.

The cap member may include an annular rim extending from the second face with the lineal member being friction welded to the second face within the annular rim such that the rim extends along an exterior of the lineal member. Alternatively, the annular rim itself mar be friction welded to the lineal member. In another embodiment, the cap member includes an annular welding surface extending from the cap member second face at a location spaced apart from the rim, with the lineal member being friction welded to the annular welding surface.

Finally, the present invention includes an energy absorbing member for a vehicle incorporating the above-described friction welded joints. The energy absorbing member includes an elongated crash box having at least one end with a circular cross-section and a bracket friction welded to the circular end. The bracket may include a raised portion defining a chamber with the circular end being received in the chamber and friction welded to the bracket within the chamber. Each end of the crash box may have a circular cross-sectional configuration and a bracket is friction welded to each circular end. One of the brackets may be configured to be attached to a vehicle and the other bracket may be configured to be attached to a bumper.

Another energy absorbing member of the present invention includes an elongated crash box, a beam defining a chamber, one end of the crash box being received within the chamber and fixed to an inside surface of the beam and a bracket assembly friction welded to the other end of the crash box. The end of the crash box within the chamber is friction welded to an inside surface of the beam. The bracket assembly includes (a) a bracket having a face and defining an opening receiving the other end of the crash box and (b) a cap member having a first face and a second face. The cap member second face is friction welded to the bracket face and the crash box other end. An annular recess in the bracket face surrounds the opening and a stepped-up portion of the bracket face surrounds the annular recess so the bracket face of the stepped-up portion and the cap member second face are positioned in a plane. The cap member may be engageable with a friction welding device to rotate the cap member via an opening therethrough which may be hexagonal, triangular or square. The crash box may be made from an extruded aluminum alloy and the bracket may be made from a cast or stamped aluminum alloy.

BRIEF DESCRIPTION OF THE DRAWINGS

The above as well as other features and advantages of the present invention can be more fully appreciated through consideration of the detailed description of the preferred embodiment in conjunction with the several figures wherein like reference characters identify like parts throughout and in which:

FIGS. 14A, 14B, 14C, and 14D illustrate various embodiments of a cap member joined to a lineal member;

DETAILED DESCRIPTION OF THE PREFERRED EMBODIMENTS

Figure 1:
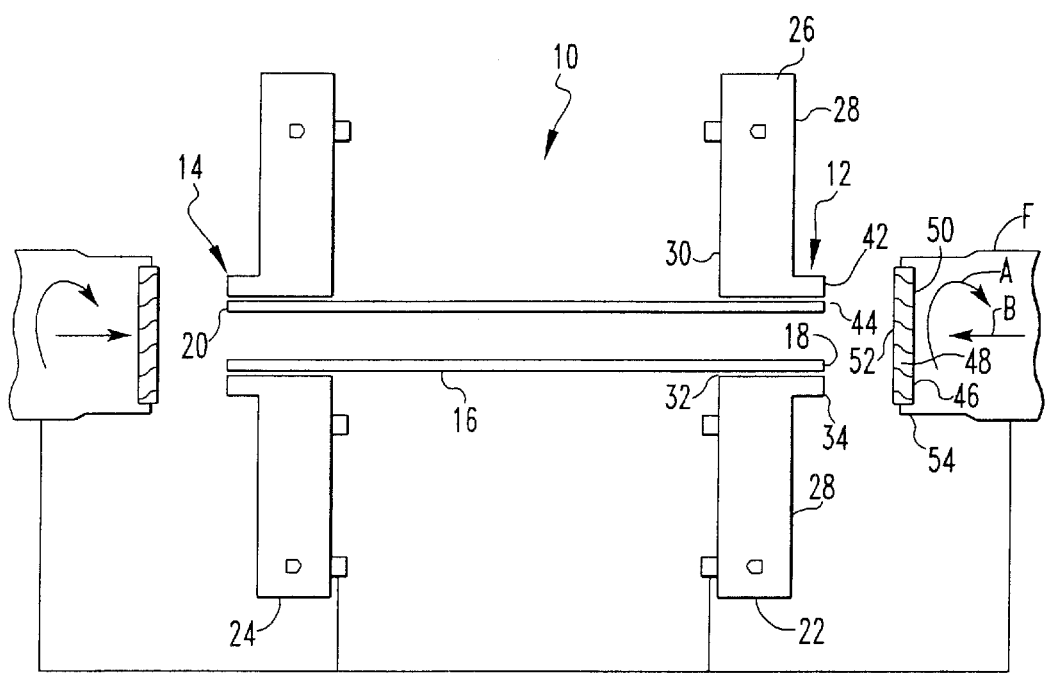
FIG. 1 is a schematic illustration of a friction welding apparatus as it could be used to manufacture the joint structure on the instant invention.

For purposes of the description hereinafter, the terms "upper", "lower", "right", "left", "vertical", "horizontal", "top", "bottom" and derivatives thereof relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

One joint structure of this invention includes the joining of concentric parts with the use of a cap member via friction welding. Friction welding is a solid state joint process that produces coalescence of materials under compressive force contact of work pieces rotating or moving relative to one another in order to produce heat and plastically displace material from the faying surfaces. Under normal conditions, the faying surfaces do not melt. Filler metal, flux and shielding gases are not required with this process. Typically, friction welding in production is an automatic weld process essentially for use with circular components or more appropriately components having a circular cross-section. The basic steps in friction welding include the rotation of one work piece while another work piece is held stationary. The two work pieces are brought together in axial compressive force, that is a function welding force is applied. Rubbing of the faying surfaces heats the work piece locally with the result that upsetting or change in length of the components begins. The process is complete when rotation of the one work piece stops and the upsetting ceases. The weld produced is characterized by the absence of a fusion zone (the narrow heat effective zone) and the presence of plastically deformed material around the weld (i.e., a flash). Weld quality is dependent upon the proper selection of material, joint design, welding variables, and post welding processes. Acceptable welds can be made in many materials using a wide range of weld parameters, that is speed, force, and time of the welding operation. A cap member is used in the present invention as a rotating work piece for friction welding.

Figure 2:
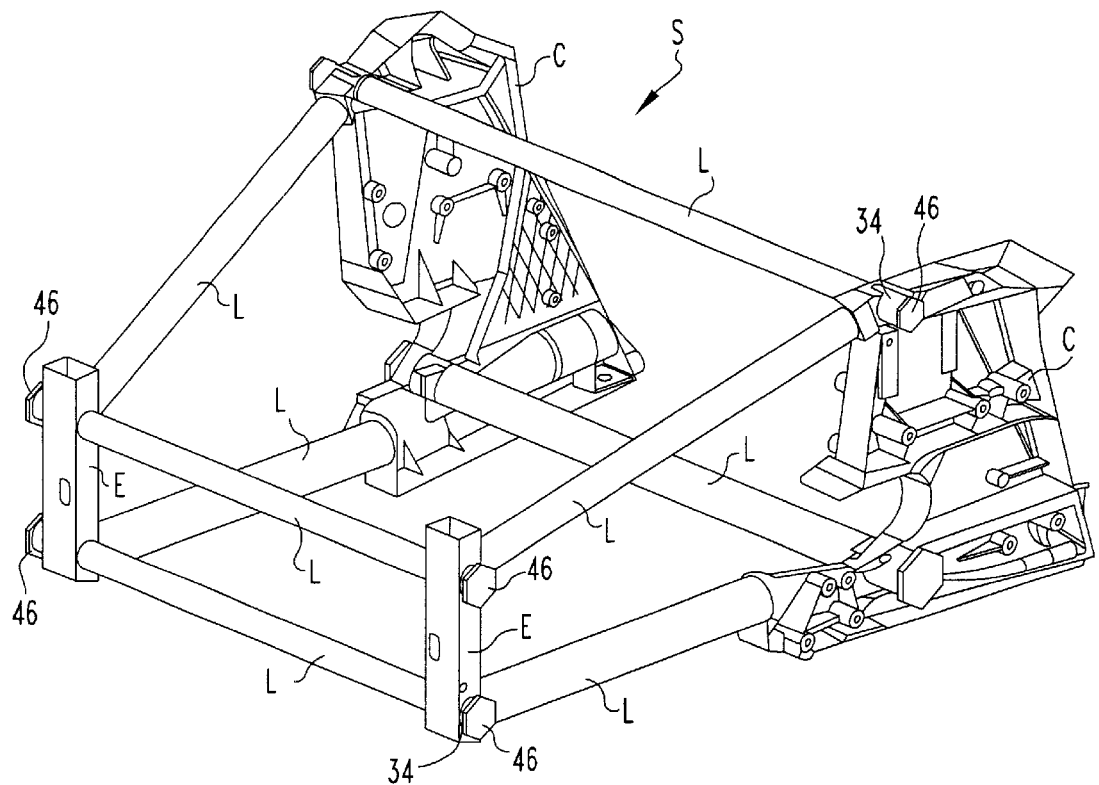
FIG. 2 is a sub-assembly for a body-in-white structure incorporating the joint structures of the instant invention.
Figure 3:
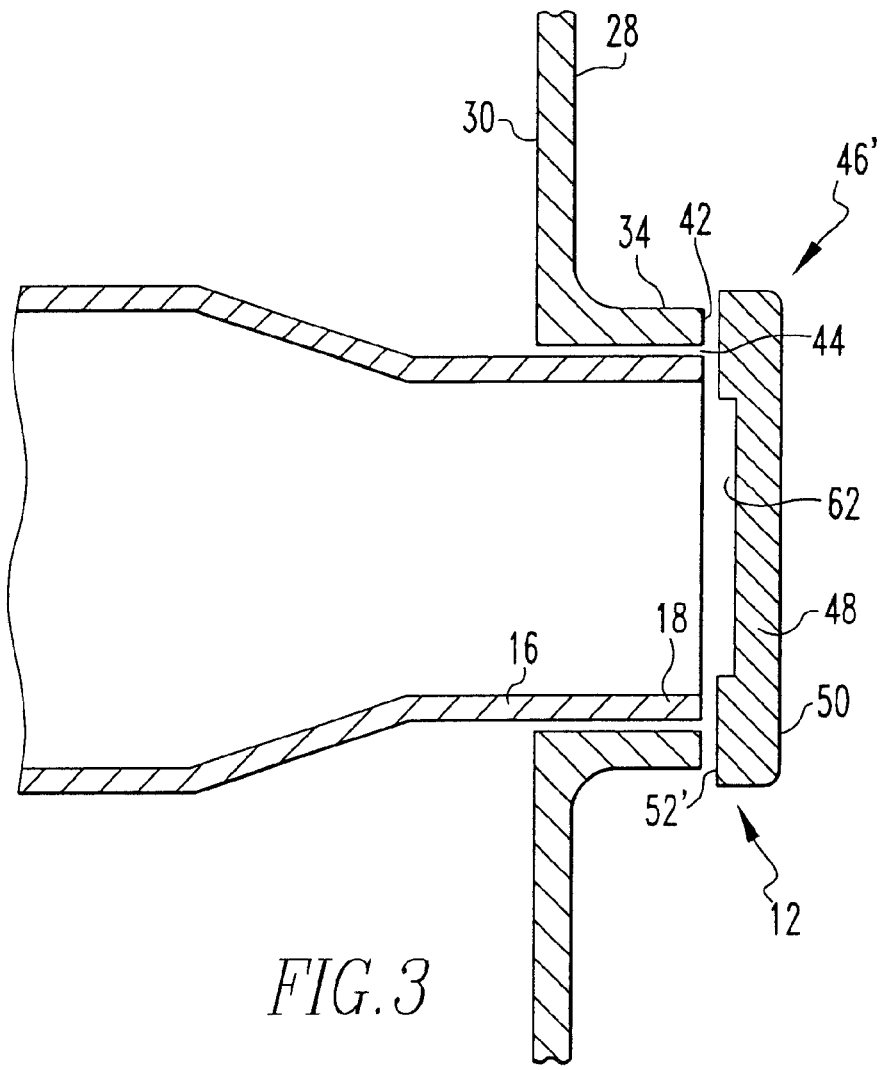
FIG. 3 is a detailed, cross-sectional view of a joint structure of the present invention.

Turning to FIGS. 1–3, the fundamental concept of this invention and its implementation are illustrated. A friction welding apparatus as schematically illustrated is shown in FIG. 1 as connecting elements of a structural assembly 10 to be incorporated into a vehicle body-in-white assembly. The structural assembly 10 includes first and second joints 12 and 4. In the structural assembly 10, a first component 16 is in the form of a lineal member having a first end 18 and a second end 20. The first and second ends 18 and 20 of the first component 16 are shown in FIG. 1 as being friction welded to separate components at each end thereof as at 22 on the right hand side and 24 on the left hand side. Other than being disposed at opposite ends of the first component 16, the components 22 and 24 may be substantially identical and symmetrical. Accordingly, only one set of reference characters will be used to describe like features of the right- and left-handed components. It will be appreciated by those skilled in the art that different or non-symmetrical components may be attached at opposed ends of the first component 16 or that only one end of the lineal member may have a second component attached to it.

The second component 22 includes a body portion 26 with a first face 28 and a second face 30. The body 22 defines an opening 32 extending from the first face 28 to the second face 30. Preferably, a cylindrically shaped boss 34 extends from the first face 28 and terminates in a boss face 42. The opening 32 extends through the boss 34 such that the end 18 of the first component 16 is received therein. When properly arranged, the boss face 42 and end 18 of the first component 16 are coterminous as at 44.

A third element of the joint 12 is a cap member 46. The cap member 46 includes a body portion 48 having a first face 50, a second face 52 and an edge portion 54. The cap member 46 is friction welded onto the coterminous boss face 42 and the end 18 of the first component 16 as at 44 by engaging the cap member 46 with a friction welding apparatus F and rotating the cap member 46 under pressure. The cap member 46 is rotated in the direction of arrow A at a speed of about 200 to about 1000 revolutions per minute and the second face 52 is urged in the direction of arrow B against the coterminous boss face 42 and end 18 at a force of about 500 to about 2000 pounds per square inch (referred to as the upset force) for a period of about one minute. The speed of rotation of the cap member 46, the upset force and the welding time may vary depending on the materials used. The second face 52 of the cap member 46, the boss face 42, and the end 18 may all be similar or dissimilar materials, such as aluminum alloys, steel, or ceramics. The cap member 46 may include an engaging means (not shown) such as a hexagonal hole which is adapted to engage a friction welding spindle of the friction welding apparatus F.

FIG. 2 shows a more complete subassembly S which may constitute for example, the rear clip of a vehicle body-in-white. Subassembly S may include a plurality of cast components C, a plurality of lineal components L, and a plurality of extruded components E in a spaced relationship. Lineal components L correspond to the first component 16 described above with cast component C and extruded components E correspond to the second components 22 and 24 of FIG. 1. A plurality of cap members 46 secures the components C, L, and E in a fixed relationship. In utilizing the joint structure of this invention, the first component 16 or lineal component L may be formed from either an extruded or sheet product form. It will be shown below that this invention contemplates the use of an improved processes and sheet product formation methodology to create the lineal member end configuration to cooperate in the joint structure of this invention. The second component 22 of FIG. 1 may include, for example, a cast component C or an extruded component E. In the use of the cast component C, the boss 34 may be cast into the structure C. In the use of an extruded component E, the boss 34 may be formed during the working of the sheet metal or by the attachment of a cast or sheet formed or extruded boss onto the face of the product C or E. As should be appreciated, substantially all of the joints between components L and each of components C and E shown in the subassembly S of FIG. 2 can be produced according to the present invention.

FIG. 3 shows an alternative cap member 46' used in the joint 12. The alternative embodiment cap member 46' includes body portion 48 with first face 50 and an annular second face 52' surrounding a recessed portion 62. In all other respects, the annular second face 52' of the cap member 46' is attached to the coterminous faces of the boss 34 and the first end 18 of first component 16 as described for cap member 46. In this detailed cross-sectional view of joint 12, the first component 16 is shown to consist of a lineal member having a non-constant cross-section. While a friction welded joint requires that the coterminous ends (e.g., of boss 34 and end 18) have circular cross-sections, it is possible to hydroform an extruded member to have a non-constant cross-section.

Figure 4A:
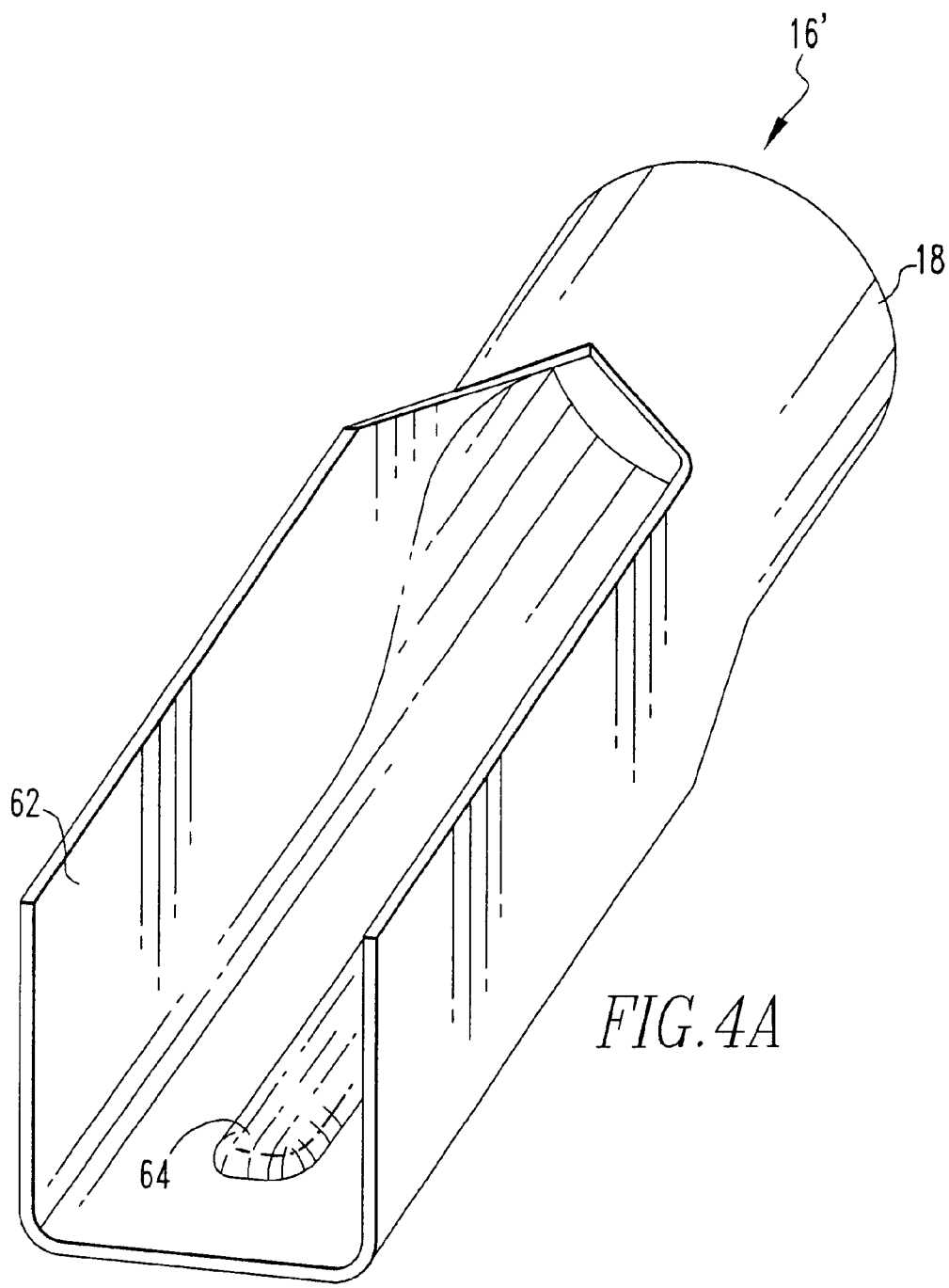
FIGS. 4A and 4B are detailed isometric views of lineal members for use in the joint structures of this invention.
Figure 4B:
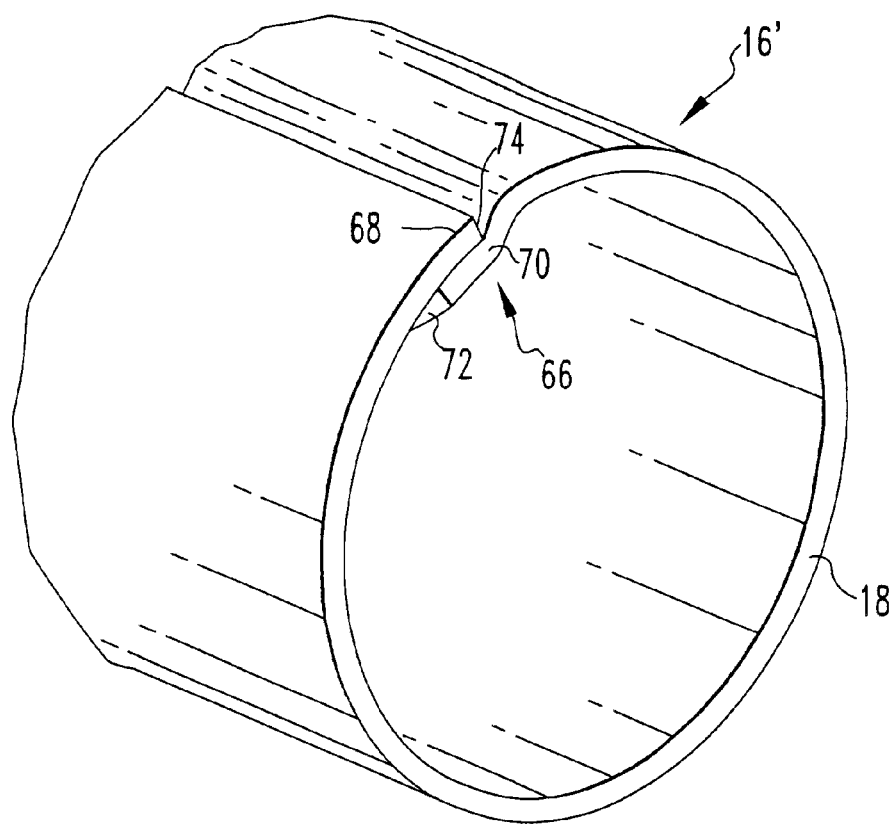

Alternatively, the first component may be formed from a sheet product. Turning to FIGS. 4A and 4B, several variations in the structure and form of a lineal member are illustrated. In FIG. 4A, a first component 16' in a sheet product form has a first end 18 that is circular in cross-section. This alternative embodiment of the lineal member 16' is shown having a generally rectangular cross-section in at least a portion of its length as at 62. With the end 18 formed into a circular cross-section, friction welding may still be used in the attachment of this lineal member 16 to a second component by means of cap member 46. It is preferred that a first component 16 made from sheet product include a reinforcing bead 64 to provide additional stiffness to the first component 16. Such stiffness facilitates the friction welding of the first component 16 during the formation of the joint. The bead 64 can be formed in a sheet product by a stamping operation. As shown in the detail of FIG. 4B, the first end 18 of first component 16 made from a sheet product may include a cross-sectional junction as at 66. In order to enhance the strength of this junction 66, which will facilitate the function welding of the first component 16 according to the joint structure of this invention, it is preferred that the ends of the sheet be overlapped as at 68 and 70. Assuming, for example, that the rotation of the cap member during the friction welding process is in a clockwise direction as the end 18 is viewed in FIG. 4B, it is preferred that the overlapped portion 70 be blunted or rounded off as at 72 in order to minimize the likelihood of damage to the junction during the high speed rotation of the cap member during the friction welding process. The overlapping end 68 need not be rounded or blunted as at 74.

Figure 5:
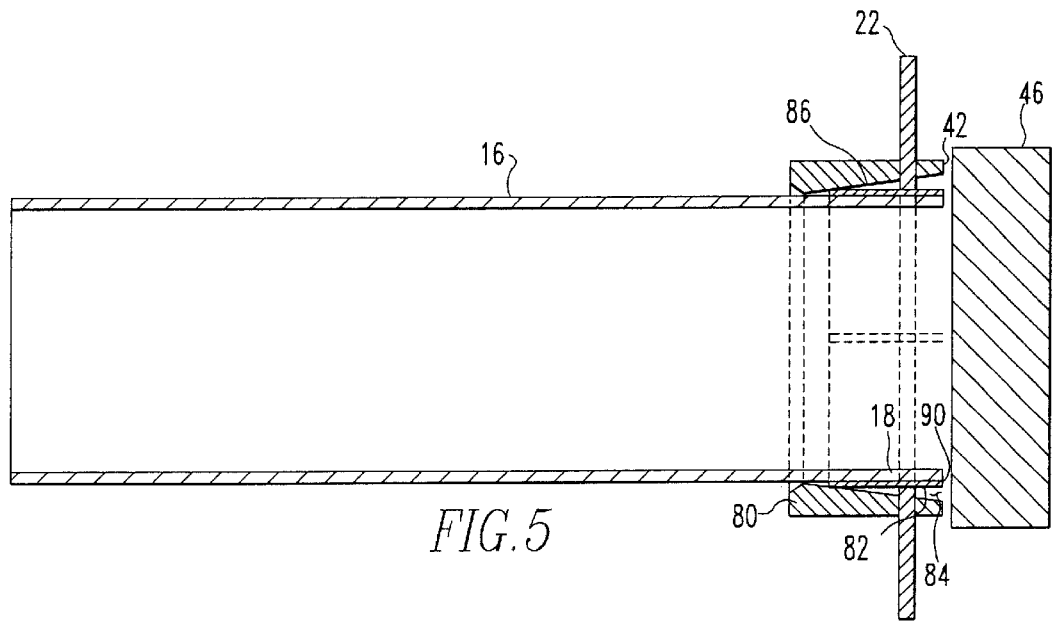
FIG. 5 is a detailed, cross-sectional view of a joint structure according to the instant invention incorporating an insertable sleeve in the gap between a lineal member and a second component.

The boss 34 shown in FIGS. 1 and 3 is integrally formed with the second component 22. In other instances, as shown in FIG. 5, it may be necessary to include a separate boss 80 that is fixed to the component 22. The boss 80 may be a cast member and may be welded to the component 22 to create a suitable boss face 42. It is another preferred feature of the joint of the present invention to provide means to transmit loading from the joint to the rest of the vehicle structure of which the joint is a part. The joints shown in FIGS. 1, 3, and 4 define a gap between the first component 16 and the boss 34 or 80. Gaps between the first component 16 and boss 34 or 80 may occur because of the compounding of the dimensional tolerance build-up of parts when fixtured or clamped for final joint formation through friction welding or alternative attachment processes. Accordingly, a sleeve 82 shown in FIGS. 5 and 6 may be used to substantially eliminate any gap existing between the first component 16 and the boss 34 or 80 of the second component 22. Referring to FIG. 5, sleeve 82 is inserted into a gap 84 between the boss 80 and the first end 18 of the first component 16. In a preferred embodiment, an inner face of the boss 80 tapers inwardly from a first diameter proximate the boss face 42 to a second, lesser diameter distal therefrom. As will be appreciated, several embodiments of the sleeve 82 may be used in conjunction with the joint structure of this embodiment.

Figure 6:
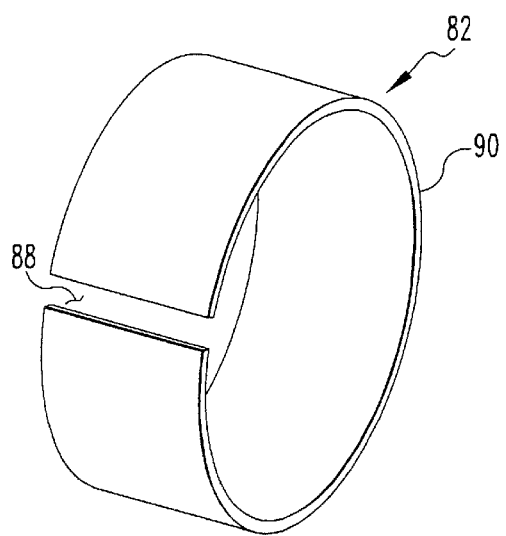
FIG. 6 is an isometric view of an insertable sleeve in a split-ring configuration.

As shown in FIG. 6, the sleeve 82 is a ring-like member that may be discontinuous, that is, it may define a split 88 to permit the sleeve 82 to have an inside diameter which is variable between a minimum and maximum limit. The sleeve 82 is adapted to be inserted between the boss inner face 86 and the first component 16 such that the cap member 46 retains the sleeve 82 therein between. As shown in FIG. 5, a first face 90 of the sleeve 82 may be coterminous with the boss face 42 and the first end 18 of the first component 16. During the attachment of the components of this joint by means of the cap member 46, the sleeve 82 may be friction welded in place. Alternatively, various other forms of joining may be used to fixedly secure the components of this joint structure in place.

Figure 7:
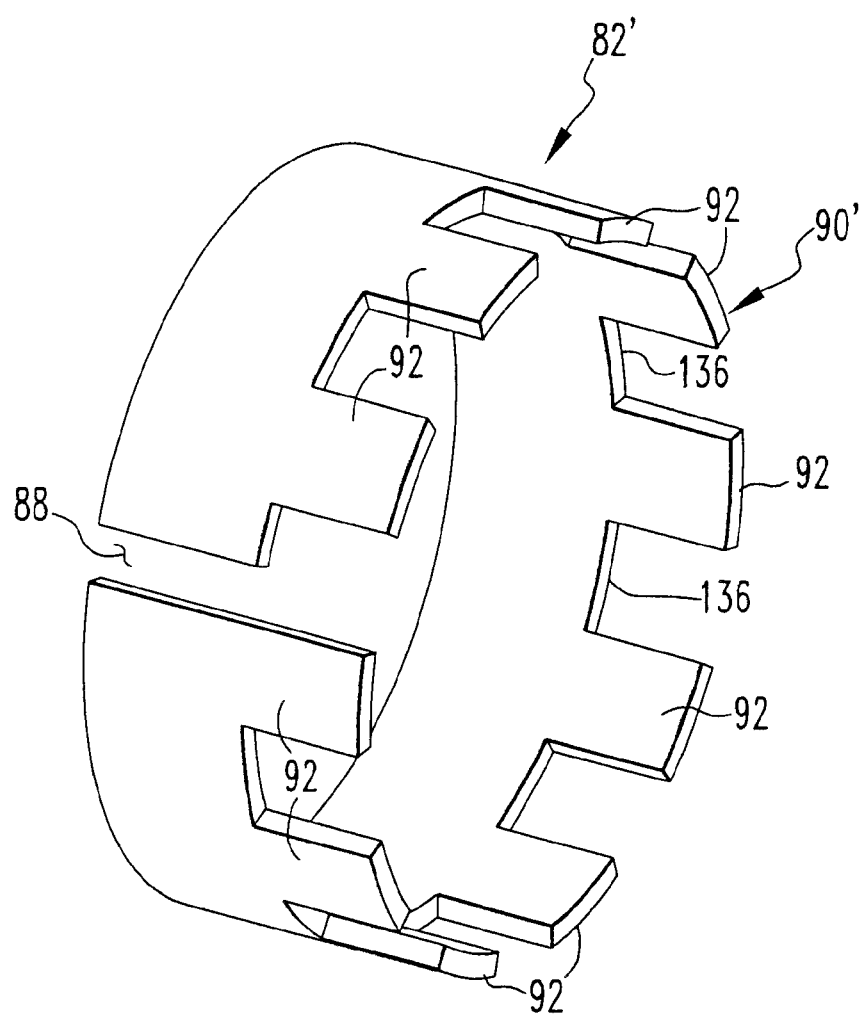
FIG. 7 is an isometric view of an insertable sleeve incorporating a non-continuous face.
Figure 8:
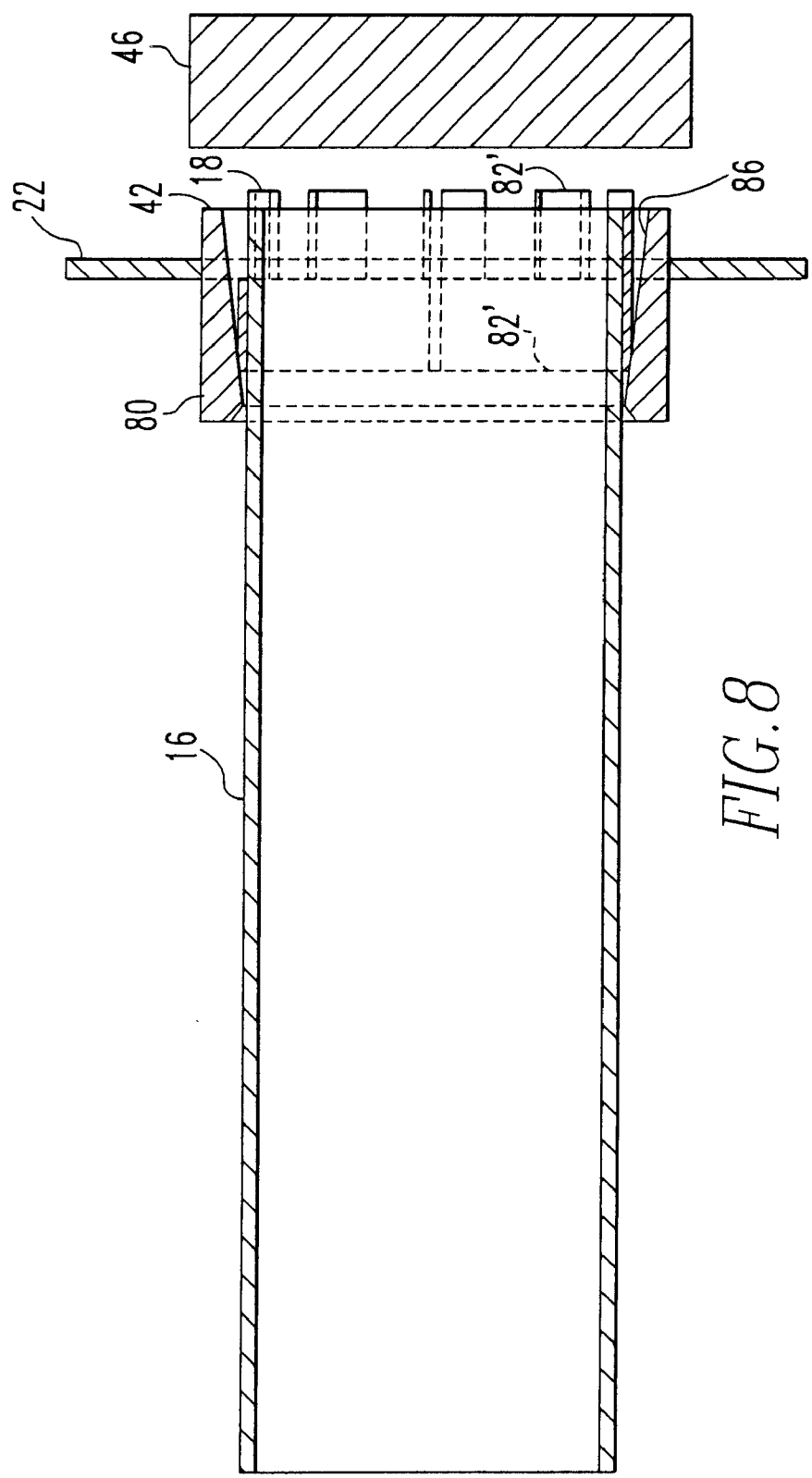
FIG. 8 is a detailed, cross-sectional view of a joint structure with the insertable sleeve as shown in FIG. 7 disposed between first and second structural components.

It may be desirable to not involve the sleeve 82 in the friction welding process. This may be accomplished using a sleeve 82' shown in FIG. 7. The alternative sleeve member 82' includes a split 88 which permits the inside diameter of the sleeve 82' to vary from a predetermined minimum to a maximum diameter. However, unlike sleeve 82, sleeve 82' has a discontinuous outer face 90' making sleeve 82' particularly well suited for friction welding of the cap member 46. The discontinuous face 90' includes a plurality of spaced apart teeth 92. The teeth 92 serve to break the continuity of the interface between the first face 90' and the cap member 46, thus leading to excessive oxide dragging into the friction weld and premature bending of the teeth. This prevents the formation of sound and strong welds between the cap member 46 and the first face 90'. As a result, once the sleeve 82' is forced by the cap member 46 during the friction welding cycle into intimate contact with the boss inner face 86, the sleeve 82' stays in place without being spun when the cap member 46 is rapidly decelerated. In other words, the sleeve 82' is decoupled from the decelerating cap member 46 by breaking the inferior welds formed between the face 90 of the sleeve 82' and the cap member 46 during the final stage of the friction welding cycle. As shown in FIG. 8, the sleeve 82' may be sized to extend slightly beyond the boss face 42, e.g., by about 0.5 mm. When the cap member 46 is placed against the boss face 42 and end 18 of first component 16, the sleeve 82' is forced against the tapered inner face 86 of the boss 80 until the ends of the teeth 92 of the sleeve 82' are coterminous with the boss face 42 and the end 18.

Figure 9:
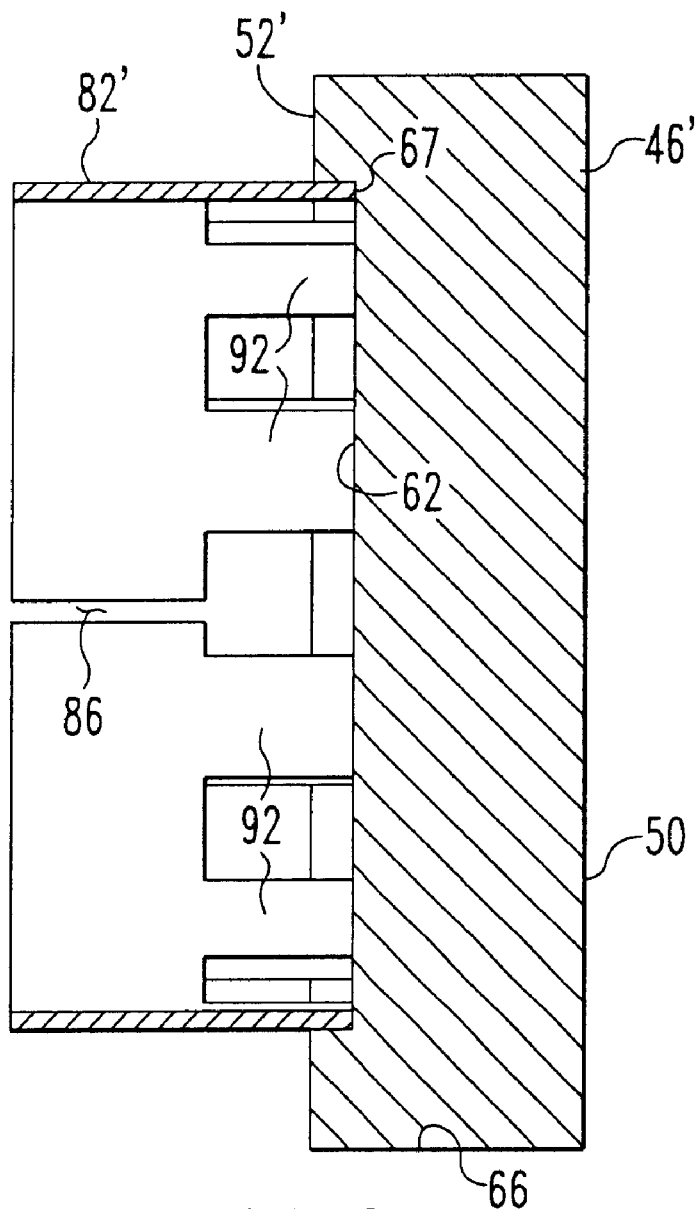
FIG. 9 is a detailed, cross-sectional view of an insertable sleeve removably engaged with the cap member or engagement member of the joint of this invention.

An alternative cap member 46' is shown in FIG. 9 for use in conjunction with the alternative sleeve 82'. The teeth 92 are slightly compressed within the recessed portion 62, such compression being facilitated by the split 88 in the sleeve 82'. This embodiment may be assembled prior to the friction welding or ultimate assembly process. This ensures that the sleeve 82' will be inserted in the gap between the boss inner face 86 and the exterior surface of the first component 16 while only the end 18 and the boss face 42 contact the second face 52' of the cap member 46'.

Figure 10A:
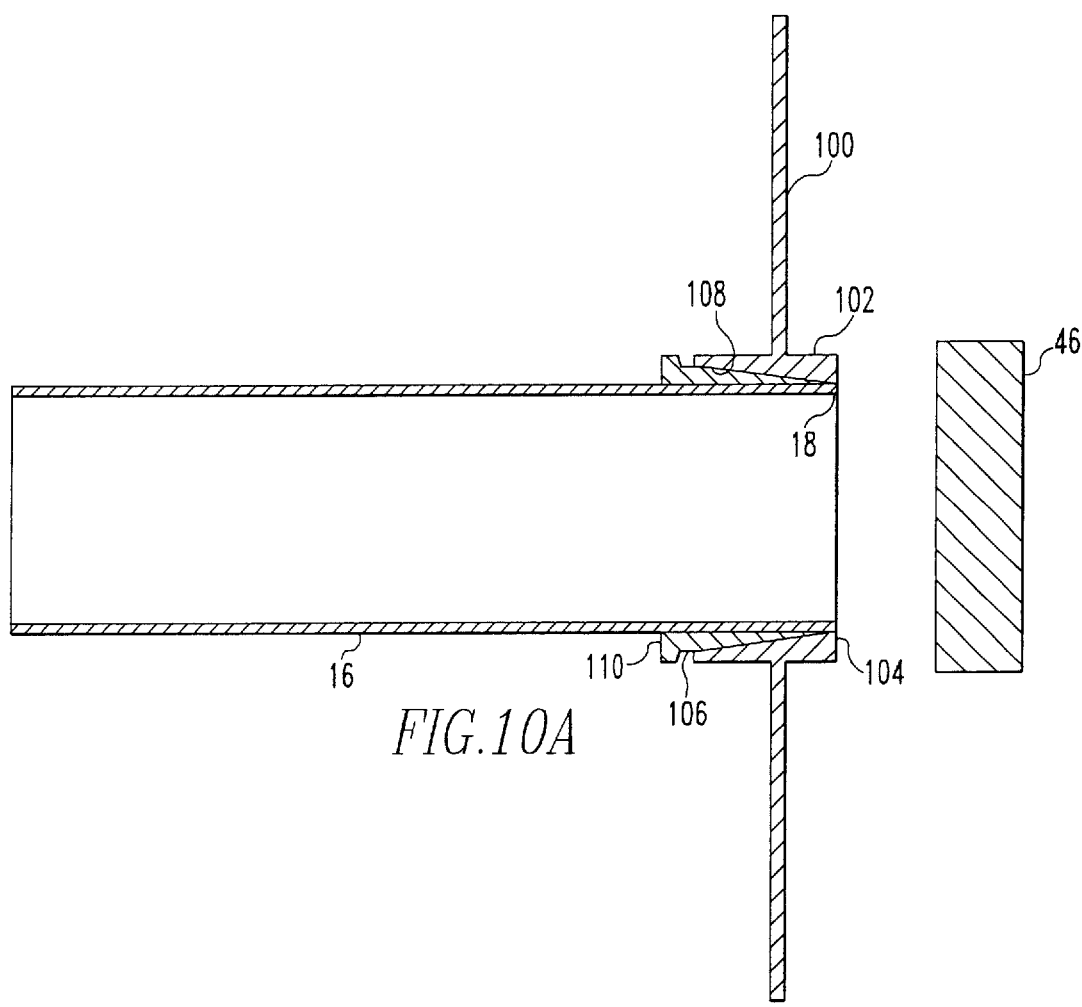
FIGS. 10A and 10B are a cross-sectional, side elevation view of an alternative embodiment of this invention incorporating a tapered and striated insertable sleeve with a tapered and striated and a cross-sectional detail of the striated insertable sleeve and striated sleeve engaging surface.
Figure 10B:
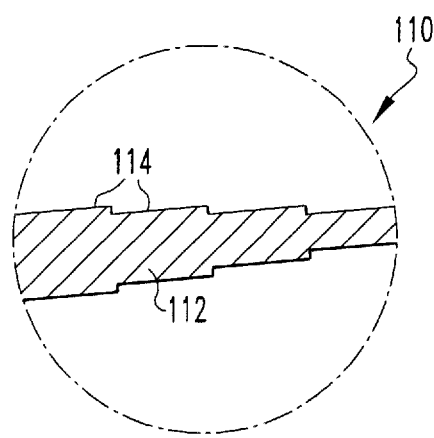

Another embodiment of the invention is shown in FIGS. 10A and 10B in which a second component 100 includes an integrally formed ring 102 having a boss face 104. The first component 16 is received within a tapered opening 106 in the ring 102 such that the end 18 is coterminous with the boss face 104. An inner face 108 of the ring 102 has a diameter which increases from a first dimension proximate the boss face 104 to a second dimension distal therefrom. A sleeve 110 is received within the opening 106 between the first component 16 and the ring inner face 108. The sleeve 110 has a tapered wall 112 which is sized to tightly fit within the tapered opening 106. The wall 112 includes a plurality of serrations 114 which enhance the mechanical bond between the wall 112 and each of the first component 16 and the ring inner face 108. This embodiment is particularly suited for welding to a second component having physical constraints which prevent the use of the arrangements shown in FIGS. 1, 5, and 8.

Building on the concepts described above in connection with the attachment of a cap member to a lineal member, what is disclosed herein particularly in conjunction with FIGS. 11–15 is an assembly approach in which lineals having end attachments secured thereto are joined to other parts with which they form desired automotive structures. More specifically, although the preferred joining process for attaching the end attachments or cap members to the lineals are friction welding and flash welding, it is to be appreciated that the concept can also be implemented by employing other joining processes that are cost-effective for given applications and that minimize heat input into the lineals. Examples of such processes include magnaforming, MIAB (magnetically impelled act butt welding), laser welding, and low heat input types of GMA (gas metal arc) welding. In its most basic construct, this embodiment incorporates the steps of joining a cap member to a lineal in which the cap member has certain further attachment means incorporated thereinto and assembling the joined cap member/lineal assembly to another component. These steps are shown in FIGS. 11A–11C in which a structural assembly generally indicated by the reference character 210 (FIG. 11C) includes at least first and second joints 212 and 214 between first component 216 (having a first end 218 and a second end 220) and right- and left-handed structural components 222 and 224. Additional joints are illustrated but will not be discussed directly.

Figure 11A:
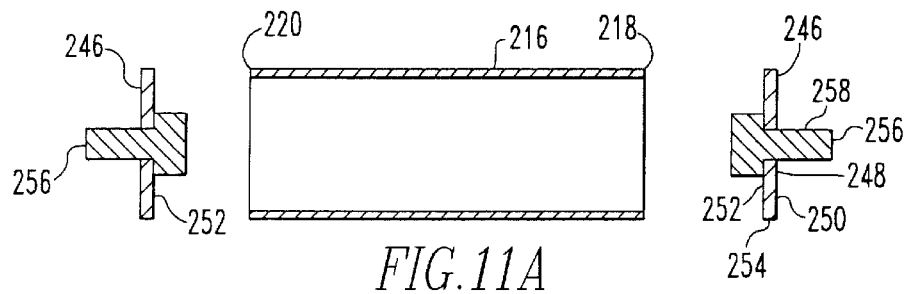
FIGS. 11A, 11B, and 11C illustrate an assembly incorporating the joint structure of this invention.
Figure 11B:
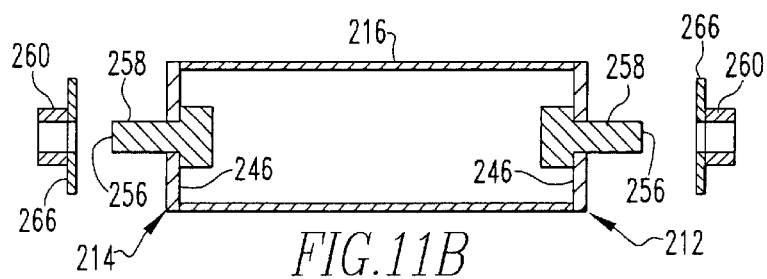
Figure 11C:
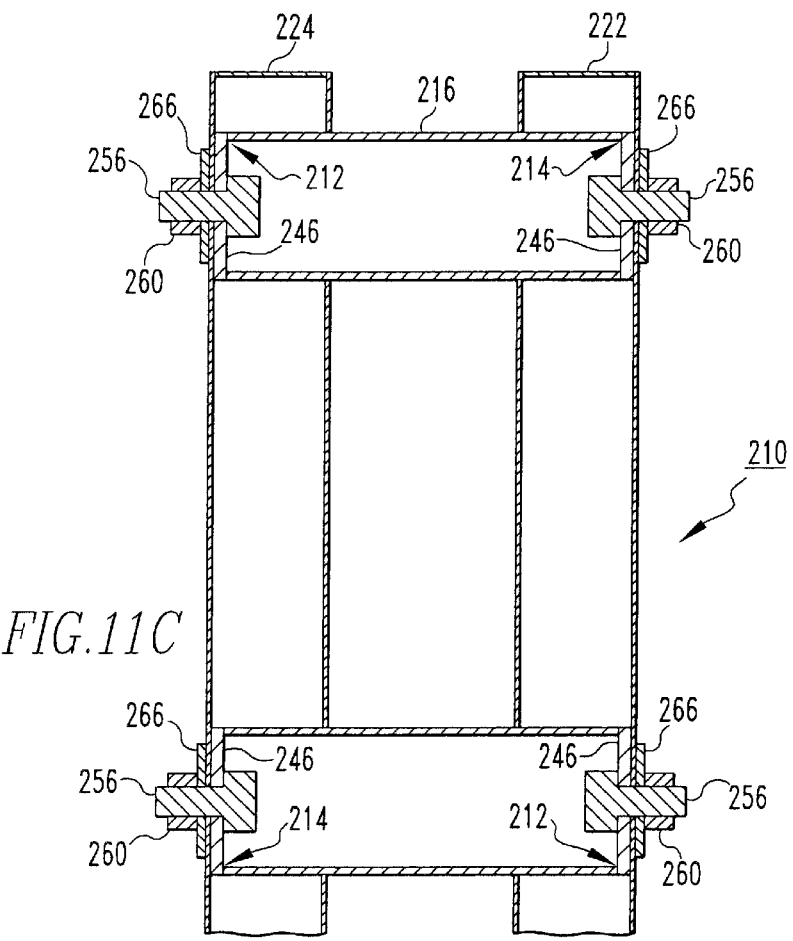
Figure 12:
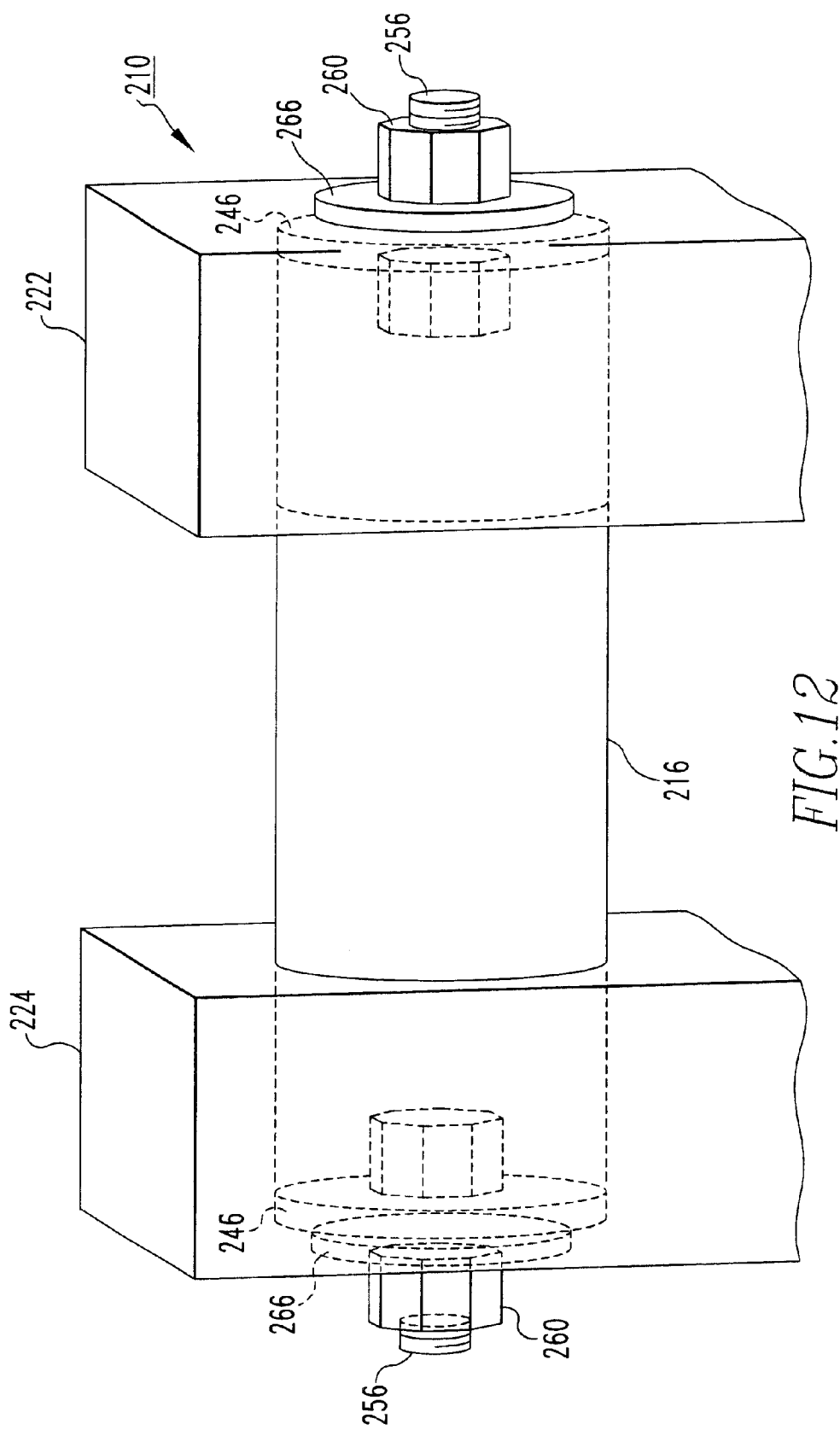
FIG. 12 is an isometric view of an assembly incorporating the features of this invention.

Returning to FIG. 11A, a cap member 246 includes a body portion 248, a first face 250, a second face 252, and an edge extending therebetween as at 254. The cap member 246 defines a bore through which an attachment means, such as a bolt 256 extends and is fixedly retained therein. Bolt 256 includes a threaded portion 258 that is configured to receive a nut 260. The bolt 256 may be retained within the cap member 246 by any number of appropriate processes including adhesive bonding and welding, by way of example. Cap members 246 are joined to the first component 216 via friction welding the first component ends 218 and 220 to faces 252. As shown in FIG. 11B, a threaded nut 260 is provided to cooperate with the threaded bolt 256. Assembly 210 can be formed for example as shown in FIGS. 11C and 12. Each of the structural components 222 and 224 define openings in which first components 216 are received. Here, two sets of first component 2116 joined to cap member 246 are disposed between structural components 222 and 224. Nuts 260 and optional locking washer 266 in cooperation with bolts 256 secure cap members 246 to the walls or body portions of structural members 222 and 224 to complete the assembly 210.

Figure 13A:
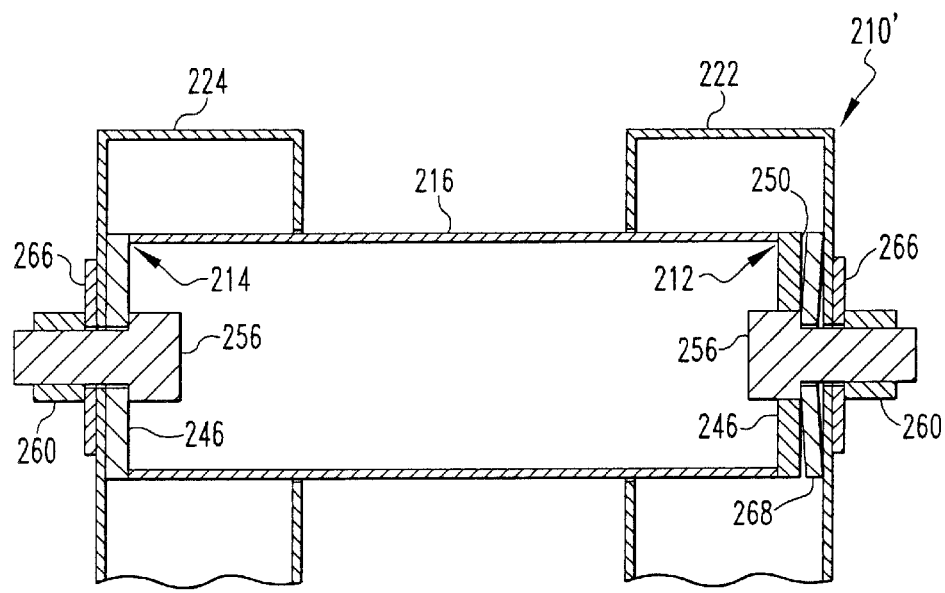
FIGS. 13A and 13B illustrate other assemblies of this invention.
Figure 13B:
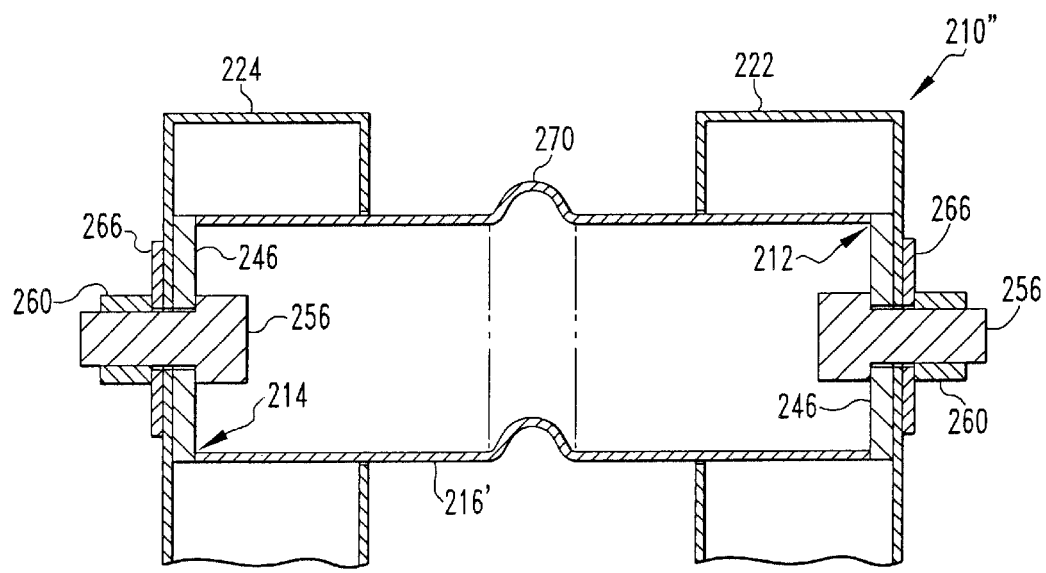

Turning to FIG. 13A, there is shown a portion of another assembly 210' of this invention in which a compliant washer 268 (e.g., a Bellville washer) is disposed between first face 250 of cap member 246 and an inner surface of structural member 222. The compliant washer 268 allows the assembly 210' to accommodate variations in the lengths of the first component 216. Another mechanism for accommodating varying length of components in an assembly 210" is shown in FIG. 13B. A first component 216' includes a deformed or bent portion 270. Bent portion 270 allows the first component 216' to compress during construction of the assembly 210".

Turning to FIGS. 14A–14D, there are illustrated multiple embodiments by which a cap member may be secured to a first component for use for example in the assemblies shown in FIGS. 11C, 12, 13A and 13B. FIG. 14A shows a "T" joint 212a formed between cap member 246a and first component 216 when the cap member 246a is friction welded to the first component 216 by rotating the cap member 246 against the first component 216 under pressure as described above. In FIG. 14B, cap member 246b includes lip 272 having a rim 274 to which first component 216 is friction welded thereby forming a butt weld 212b. As a result of friction welding, flash may be formed exterior to the first component 216. It may be desirable to avoid producing visible flash for either structural and/or aesthetic reasons. Hiding of flash can be accomplished through the use of alternative configurations shown in FIGS. 14C and 14D. Referring to FIG. 14C, cap member 246c defines a recess 276 bounded by face 278 and into which first component 216 is received. First component 216 abuts face 278 and is friction welded thereto to form a "T joint". Flash formed in the friction welding process is collected in the recess 276 between the first component 216 and rim 272 of cap member 246c. Alternatively, as shown in FIG. 14D, cap member 246d includes a joining member 280 extending from face 278 which has substantially identical cross-sectional dimensions as the first component 216. Joining member 280 and first component 216 are friction welded together. Flash formed thereby collects in recess 276 between rim 272 of cap member 246 and joining member 280.

Figure 15A:
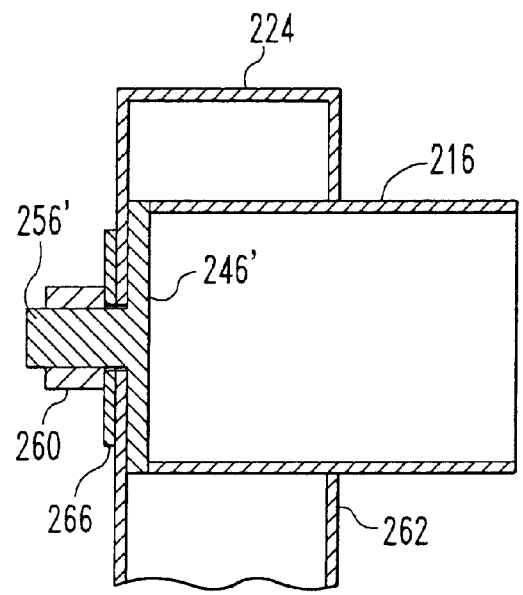
FIGS. 15A and 15B illustrate arrangements for assembling the joint structure.
Figure 15B:
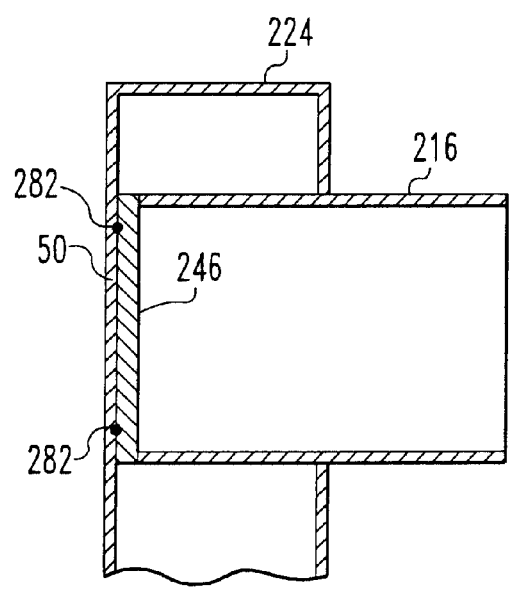

Other mechanisms for fixing a first component (lineal member) prejoined to a cap member to other portions of an assembly as alternatives to the mechanisms shown in FIGS. 11C, 12, 13A and 13B are depicted in FIGS. 15A–B. In the mechanism shown in FIG. 15A, a cap member 246' includes an integrally formed stud 256' which may be threaded so as to receive thereon threaded nut 260. Self-locking washer 266 may be disposed between the outer surface of the structural member 224 and the nut 260. FIG. 15B shows the use of cap member 246 friction welded to first component 216 as described in reference to FIG. 14A. Face 50 of cap member 246 may be fixed to an inner surface of structural component 224 at locations 282 via friction stir welding (FSW), or laser welding (LW) respectively. Bolting and riveting may also be used in lieu of welding.

When the friction welding process is used to preassemble the lineals 216, 216' with the cap members 246, 246' and these components may be made from different materials that normally would not be weldable. Examples of this include stainless steel cap members attached to 6xxx or 7xxx lineals or 7xxx cap members attached to 6xxx lineals. The flexibility of this invention broadens the assortment of designs and joining options for automotive structures that may incorporate in their body-in-white the assembly and joint techniques of this invention.

Figure 16:
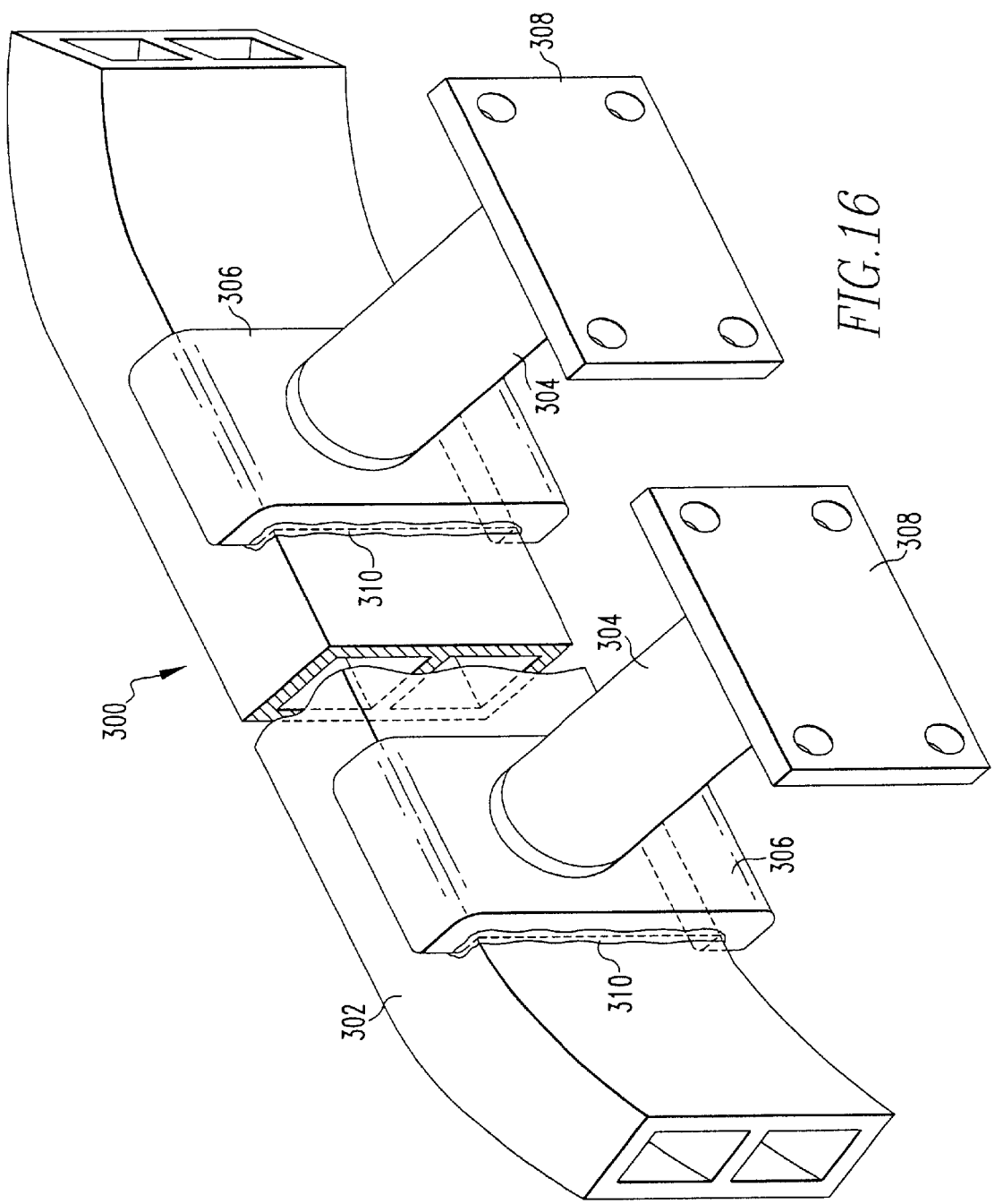
FIG. 16 illustrates a bumper assembly having friction welded joints.
Figure 17A:
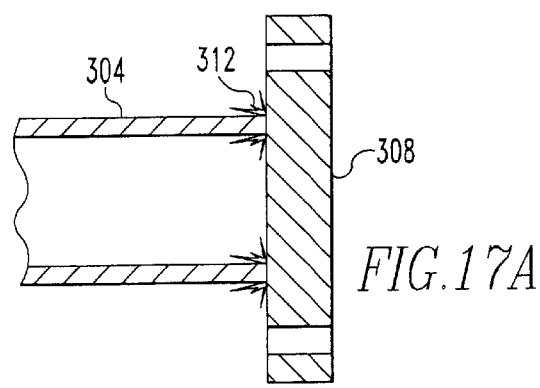
FIGS. 17A, 17B, and 17C, illustrate alternative friction weld joints of a crash box assembly.
Figure 17B:
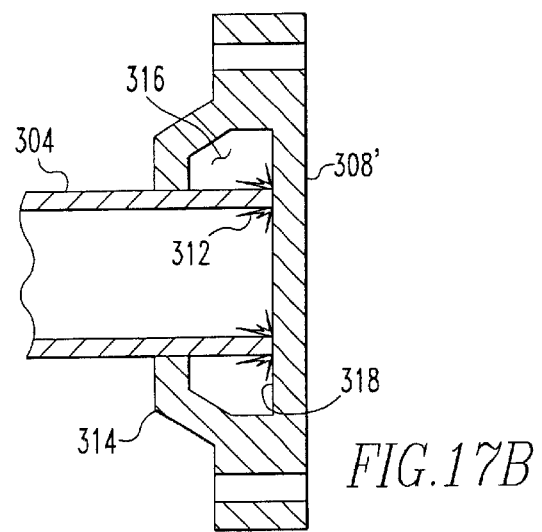
Figure 17C:
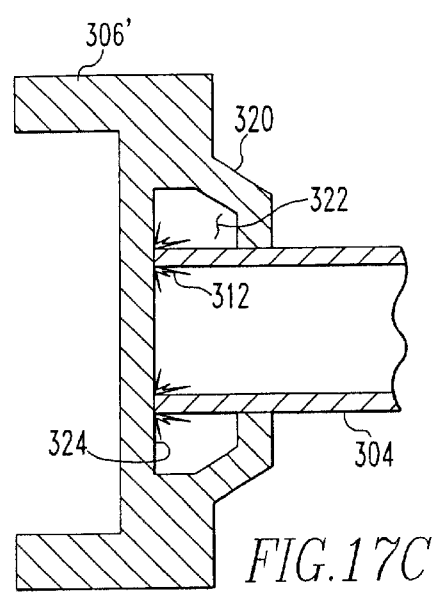

The friction welded joints of the present invention are particularly well adapted for use as in an assembly of an energy absorbing member such as a bumper. The assembly may be more readily, more easily, and more inexpensively produced than standard assembly processes utilizing welding, bolting, or riveting. FIG. 16 shows an energy absorbing assembly 300 including a bumper beam 302, with crash boxes 304 connected at one end to the bumper beam 302 via bumper brackets 306 and connected at the other end to attachment brackets 308. Attachment brackets 308 are configured to be removably mounted to a vehicle. The bumper brackets 306 are fixed to the bumper beam 302 preferably via welding, such as GMA (gas metal arc) welding as indicated at 310. The crash boxes 304 are cylindrical at least at their ends. As such, crash boxes 304 are friction welded to the bumper brackets 306 and attachment bracket 308. The friction weld joint between a crash box 304 and an attachment bracket 308 is shown in FIG. 17A. Flash 312 forms at the location of the friction weld joint. The flash 312 can be mechanically removed by subsequent process after the welding is completed. Alternatively, as shown in FIG. 17B, an attachment bracket 308' may be used which includes a raised portion 314 with an opening therein extending into a recessed chamber 316 bounded in part by welding surface 318. The crash box 304 is friction welded to surface 318 within recessed chamber 316. Flash 312 created in friction welding is retained within the recessed chamber 316. Likewise, as shown in FIG. 17C, a bumper bracket 306' may include a raised portion 320 with an opening therein extending into a recessed chamber 322 bounded in part by welding surface 324. Flash 312 created when crash box 304 is friction welded to surface 324 is retained within the recessed chamber 322.

Figure 18:
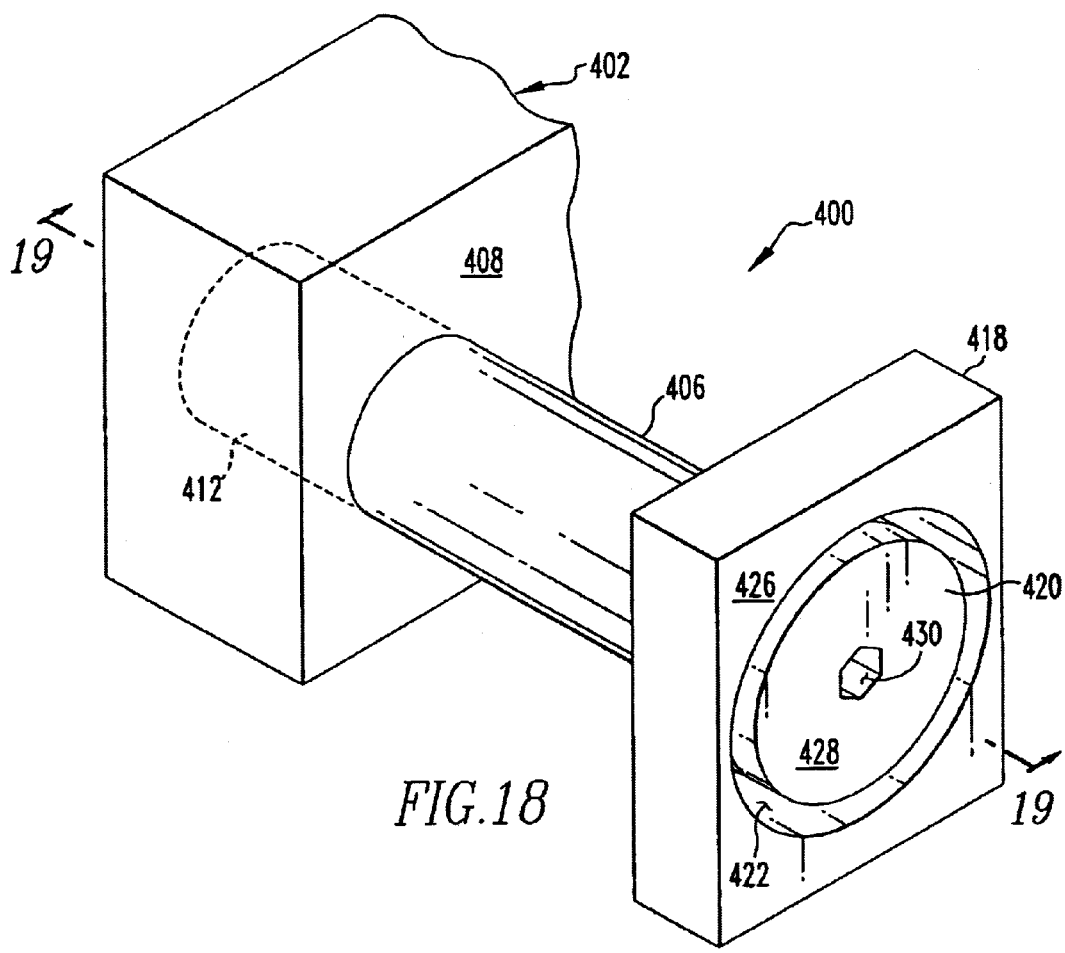
FIG. 18 illustrates another crash box assembly.
Figure 19:
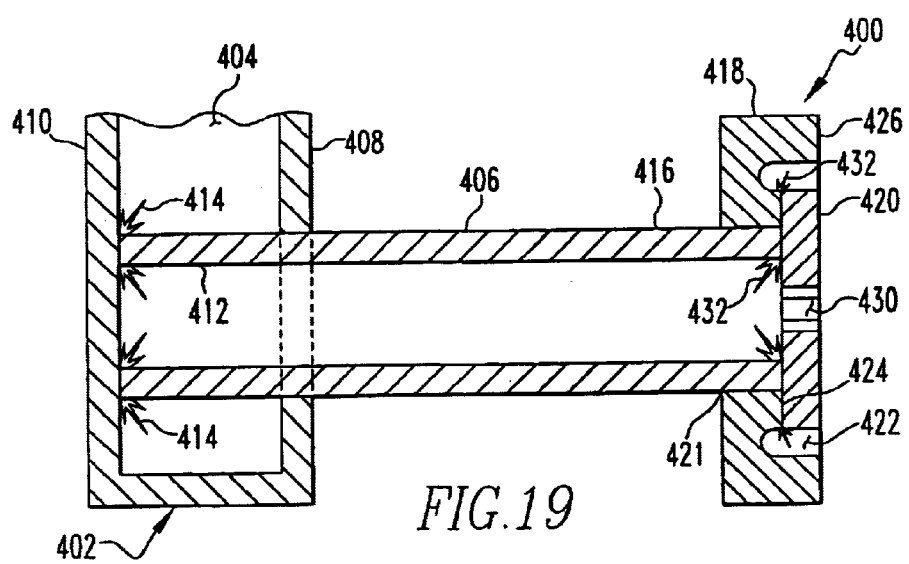
FIG. 19 is a cross-sectional view of the crash box assembly of FIG. 18 taken along lines 19—19.

FIGS. 18 and 19 show another energy absorbing assembly 400 made in accordance with the present invention. The assembly 400 includes a bumper beam 402 defining a chamber 404 into which crash box 406 extends. Crash box 406 has a circular cross-sectional configuration and may be an extruded tube produced from an aluminum alloy. The chamber 404 is bounded at least by sides 408 and 410 of the beam 402. An opening defined in side 408 is sized to receive the crash box 406. One end 412 of crash box 406 is fixed to an inside surface of side 410, such as by friction welding as described above. Flash 414 produced in friction welding is retained within the chamber 404. The assembly 400 also includes a mounting bracket 418 and a cap member 420 friction welded to the other end 416 of the crash box 406 and mounting bracket 418. Mounting bracket 418 may have a rectangular or circular configuration and defines an opening 421 to receive the crash box 406. The mounting bracket 418 may be produced from cast or stamped aluminum alloy. An annular recess 422 surrounds the opening on one face 424 of the mounting bracket 418. A peripheral portion 426 of the mounting bracket 418 may be stepped up and sized so that that face 424 of portion 426 lies in the same plane as or in a plane above an exposed face 428 of the cap member 420.

Cap member 420 may define a tool receiving opening 430 (e.g. a hexagonal, triangular or square keyhole) to mate with a friction welding machine for rotating the cap member 420. The energy absorbing assembly 400 may be produced by friction welding cap member 420 to crash box end 416 and mounting bracket 418 as described above by rotating the cap member 420 against stationary end 416 and stationary surface 424, followed by friction welding the crash box end 412 to the inner surface of side 410. Flash 432 produced in friction welding may collect in the recess 422.

Due to the principal dependence of the friction welding process on the rapid and controlled application of rotational (i.e., kinetic) energy and axial force (i.e., pressure) at the faying surfaces being joined, the process achieves several key results. First, the process yields extremely consistent joint quality with aluminum. Typically, there are no objectionable discontinuities in the joint. This results in a substantial reduction in the required amount of both destructive and non-destructive tests of these friction weld joints during production. Obvious cost savings result from this quality welding process. Secondly, the process has very little dependence on the dimensional tolerances of the crash boxes and brackets. This significantly reduces the need and cost of having to closely maintain the tolerances of such parts. Cylindrical crash boxes can simply be saw-cut in preparation for friction welded joining. Thirdly, this process will minimize if not eliminate completely the costly step of surface treating which is essential with other welding processes. Additionally, because friction welding is a low-heat input process with extremely firm and precise holding of parts, there will be very small weld-induced distortions caused by joining the crash boxes and brackets. In addition, close control over stopping the cycle can yield plus or minus one percent angular registration between joint brackets. This in conjunction with the limited GMA welding of the bumper brackets to the bumper may quite possibly make it feasible to accomplish all machine/drilling of the components prior to assembly. Moreover, because friction welding involves very rapid application of low heat to effect the joining, it becomes practically alloy independent. Unlike the GMA welding process which requires careful selection of base metals/filler alloy combinations, friction welding enables joining the crash box 304 to brackets 306 and 308 and crash box 406 to beam 402 and bracket 418 with almost any aluminum alloy combination.

It should be appreciated that subframes and subassemblies such as even, for example, engine cradles, that are based on the use of tubular components friction welded to components with multi-faceted (that is square or rectangular or combinations of curvilinear portions) cross-sections, will facilitate a variety of designs that are more economically produced and assembled. Obviously, for the use of the friction welded process as disclosed herein in combination with the various elements shown, tubular aluminum components can consist of extrusions that are friction welded to components with multi-faceted cross-sections. The joining of bumper mounting brackets to the bumper can be done with riveting or bolting instead of gas metal arc welding. The bumper mounting brackets and attachment brackets may be produced from stampings, castings, and/or extrusions. In the case of extrusions, straight length extrusions could be simply cut to length.

It is to be appreciated since both the friction and flash welding processes require minimal joint preparations, and that as received and as saw-cut parts can be joined, with minimal or no cleaning, to capped members of the respective lineals, a significant cost reduction may be realized by adapting the proposed assembly approach of this invention. Additionally, by the provision of attachment means to the cap member, a further cost reduction will be realized by using the very simple joining process that is bolting or riveting during the final assembly stage.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the fill breadth of the appended claims and any and all equivalents thereof.

What is claimed is:

1. An energy absorbing assembly for a vehicle comprising:
   an elongated crash box;
   a beam defining a chamber bounded at least by opposing sides of said beam, one end of said crash box being received within said chamber through a peripheral opening defined in one of said opposing sides and fixed to an inside surface of the other of said opposing sides, and
   a bracket assembly friction welded to said other end of said crash box.

2. The energy absorbing assembly of claim 1, wherein said one end of said crash box within said chamber is friction welded to said inside surface.

3. An energy absorbing assembly for a vehicle comprising:
   an elongated crash box;
   a beam defining a chanber, one end of said crash box being received within said chamber and fixed to an inside surface of said beam; and
   a bracket assembly friction welded to said other end of said crash box, wherein said brackety assembly includes (a) a bracket having a face and defining an opening receiving said other end of said crash box and (b) a cap member having a first face and a second face, said cap member second face being friction welded to said bracket face and said crash box other end.

4. The energy absorbing assembly of claim 3, wherein said bracket first face defines an annular recess surrounding said opening.

5. The energy absorbing assembly of claim 4, wherein said bracket includes a stepped-up portion surrounding said annular recess, said bracket face of said stepped-up portion and said cap member second face being positioned in a plane.

6. The energy absorbing assembly of claim 3, wherein said cap member defines an opening for engaging with a friction welding device to rotate said cap member against said bracket face and said crash box other end.

7. The energy absorbing assembly of claim 6, wherein said opening is one of hexagonal, triangular or square.

8. The energy absorbing assembly of claim 3, wherein said crash box comprises extruded aluminum alloy.

9. The energy absorbing assembly of claim 8, wherein said bracket comprises cast or stamped aluminum alloy.

* * * * *